United States Patent
Irie et al.

(12) United States Patent (10) Patent No.: US 9,417,619 B2
(45) Date of Patent: Aug. 16, 2016

(54) NUMERICAL CONTROLLER HAVING FUNCTION OF RE-MACHINING THREAD CUTTING CYCLE

(71) Applicant: FANUC CORPORATION, Minamitsuru-gun, Yamanashi (JP)

(72) Inventors: Kouhei Irie, Minamitsuru-gun (JP); Shuji Ogawa, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 411 days.

(21) Appl. No.: 14/155,400

(22) Filed: Jan. 15, 2014

(65) Prior Publication Data

US 2014/0200707 A1   Jul. 17, 2014

(30) Foreign Application Priority Data

Jan. 17, 2013   (JP) .................................. 2013-006360

(51) Int. Cl.
  G06F 19/00    (2011.01)
  H02P 5/46     (2006.01)
  B23B 3/28     (2006.01)
  B23B 1/00     (2006.01)
  G05B 19/18    (2006.01)

(52) U.S. Cl.
  CPC .... *G05B 19/182* (2013.01); *G05B 2219/45215* (2013.01); *G05B 2219/50211* (2013.01); *G05B 2219/50225* (2013.01)

(58) Field of Classification Search
  None
  See application file for complete search history.

(56) References Cited

U.S. PATENT DOCUMENTS

| 4,173,786 A | 11/1979 | Kuhnell et al. |
| 6,155,148 A * | 12/2000 | Shinozaki ............ G05B 19/186 409/66 |
| 2001/0013267 A1* | 8/2001 | Endo .................... G05B 19/186 82/11 |
| 2005/0168178 A1 | 8/2005 | Toyozawa et al. |
| 2012/0065768 A1* | 3/2012 | Sakata .............. B23B 29/03482 700/187 |

FOREIGN PATENT DOCUMENTS

| JP | S60-228020 A | 11/1985 |
| JP | S62-99020 A  | 5/1987  |
| JP | 2005-216135 A | 8/2005 |
| JP | 2005-224942 A | 8/2005 |
| JP | 2010-247246 A | 11/2010 |

OTHER PUBLICATIONS

Office Action issued Nov. 24, 2015 in German Patent Application No. 10 2014 000 309.4 (14 pages) with an English Translation (8 pages).
Dr. Johannes, "CNC Pilot 620: The Contouring Control for CNC Lathes," Traunreut, Aug. 2010, pp. 1-32, Heidenhain GmbH internal firm document.

* cited by examiner

*Primary Examiner* — Mohammad Ali
*Assistant Examiner* — MD Abul Azad
(74) *Attorney, Agent, or Firm* — Drinker Biddle & Reath LLP (57) ABSTRACT

A numerical controller controlling a machine tool calculates a number of incisions to a thread on the basis of an incision start position in a feed axis direction and an incision start position in a direction of an incision axis of a thread which are measured in a state in which a workpiece (a thread in the process of machining) is attached to a chuck of the machine tool, calculates an amount of phase deviation of a screw thread caused by reattachment of the workpiece on the basis of the calculated number of incisions, and re-machines the thread by positioning the workpiece and the tool while taking into consideration of the amount of phase deviation.

3 Claims, 9 Drawing Sheets

NUMERICAL CONTROLLER HAVING FUNCTION OF RE-MACHINING THREAD CUTTING CYCLE

RELATED APPLICATION DATA

This application claims priority under 35 U.S.C. §119 and/or §365 to Japanese Application No. 2013-006360 filed Jan. 17, 2013, the entire contents is incorporated herein by reference.

BACKGROUND OF THE INVENTION

1. Field of the Invention

The present invention relates to a numerical controller for controlling a machine tool carrying out thread cutting, and more particularly to a numerical controller having a function of re-machining a thread cutting cycle.

2. Description of the Related Art

In the following description, reattaching a thread which is once detached from a chuck of a machine tool to the chuck so as to machine the thread, in the case where a thread which is interrupted to be machined due to breakage of a tool is re-machined, or in the case where a finish machining of the thread is achieved by the other machine after the thread is roughly machined or intermediately machined, is referred to as "re-machining of thread".

Figure 1A:
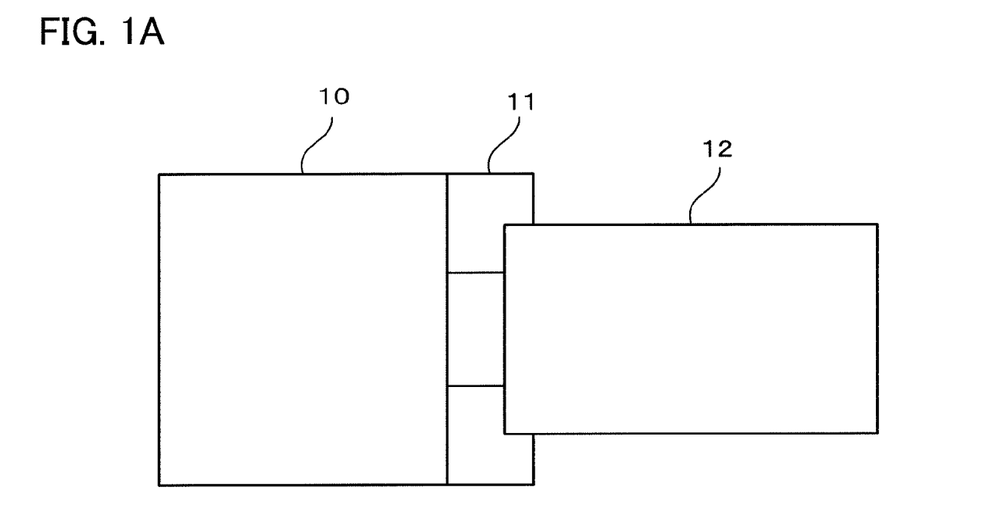
FIGS. 1A and 1B are views for explaining a thread which is reattached to a chuck fixed to a spindle of a machine tool.
Figure 1B:
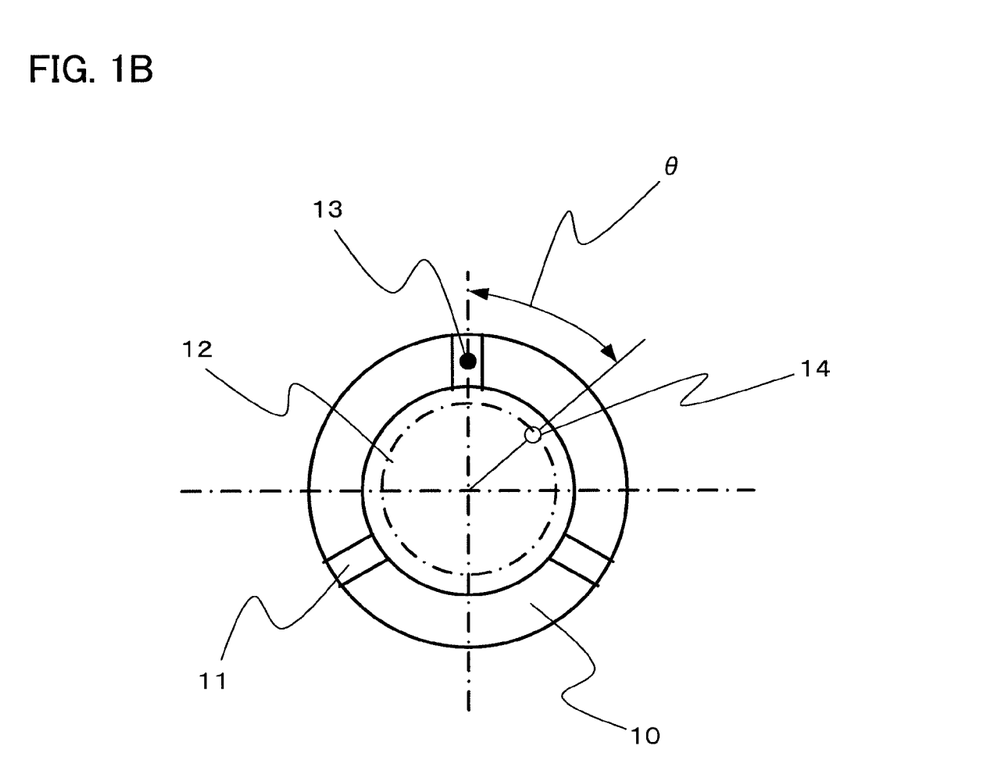

FIGS. 1A and 1B are views illustrating a thread which is reattached to a chuck fixed to a spindle of a machine tool.

A thread is attached to a chuck claw 11 of a chuck 10 which is fixed to a spindle of a machine tool (not shown). In the case where the thread is once detached from the chuck 10 and the thread is thereafter reattached to the chuck 10, a thread cutting start position of the reattached thread 12 is deviated at a phase $\theta$ of a screw thread from a threading cutting start position of the thread before the reattachment.

A technique relating to the thread re-machining is disclosed in Japanese Patent Application Laid-open No. 64-9127 and Japanese Patent Application Laid-open No. 60-228020.

The previously cut thread groove is re-machined by changing a timing for starting movement of a feed axis while taking into consideration a delay of a servo system, a delay from detection of pulse data of a spindle rotating speed to an end of computation, a delay caused by acceleration and deceleration, and an amount $\theta$ of phase deviation of the screw thread caused by the reattachment of a workpiece (a thread in the process of machining) to the chuck. In the following description, a workpiece is referred to as a thread in the process of machining.

The amount $\theta$ of phase deviation of the screw thread caused by the reattachment of the workpiece to the chuck can be calculated by measuring a position of the thread groove of the workpiece which is attached to the chuck for re-machining. In other words, the amount $\theta$ of phase deviation of the screw thread can be calculated from a position in a feed axis direction which is measured by reattaching the thread in the process of machining to the chuck 10, and thereafter applying a cutting tool to the thread groove of the thread (the reattached thread 12).

Figure 2:
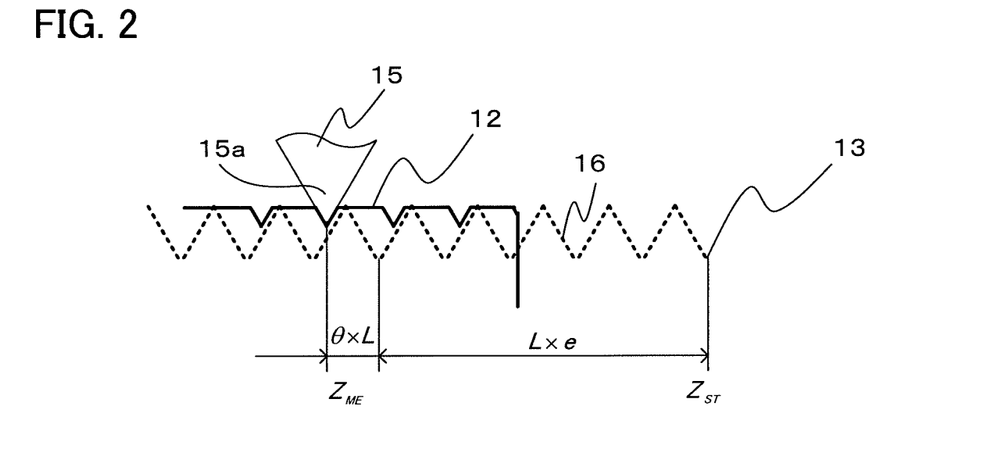
FIG. 2 is a view illustrating a method of measuring a thread groove position.

FIG. 2 is a view describing a method of measuring the position of the thread groove.

The thread is reattached to the chuck 10 which is fixed to the spindle of the machine tool (not shown), and the chuck 10 is stopped at a reference position. Then, a cutting edge 15a of a cutting tool 15 is applied to a groove of the thread 12 which is reattached to the chuck 10. Further, a numerical controller controlling the machine tool stores a position $Z_{ME}$ (mm) of the thread groove in a feed axis direction for starting the thread cutting and a position $Z_{ST}$ (mm) in the feed axis direction in a memory device in the numerical controller, at a time of inputting a signal or issuing a command according to a machining program.

Accordingly, the amount $\theta$ (rev) of the phase deviation of the screw thread due to the reattachment can be calculated by the following expression (1).

$$\theta = \frac{|Z_{ME} - Z_{ST}| - L \times e}{L} \quad (1)$$

$$e = [|Z_{ME} - Z_{ST}|/L]$$

In the above expression, L (mm) represents a lead (pitch) of the thread, and mark [x] is a Gaussian symbol indicating a maximum integer which does not go beyond x.

In the thread cutting cycle, the thread cutting based on a one-edge cutting or a zigzag cutting is frequently used. The one-edge cutting or the zigzag cutting is a machining method having an advantage that a cutting resistance can be reduced and a disposal capacity of chips can be improved, by using a piece of one side of a cutting edge of a cutting tool for cutting.

Figure 3:
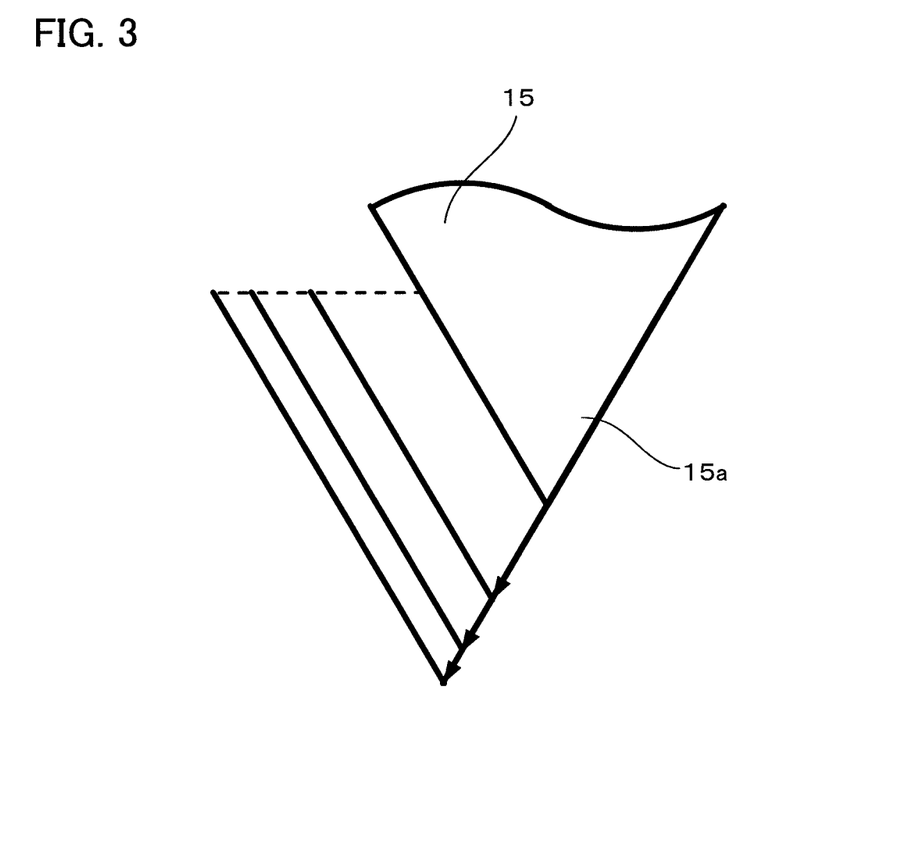
FIG. 3 is a view illustrating a one-edge cutting.
Figure 4:
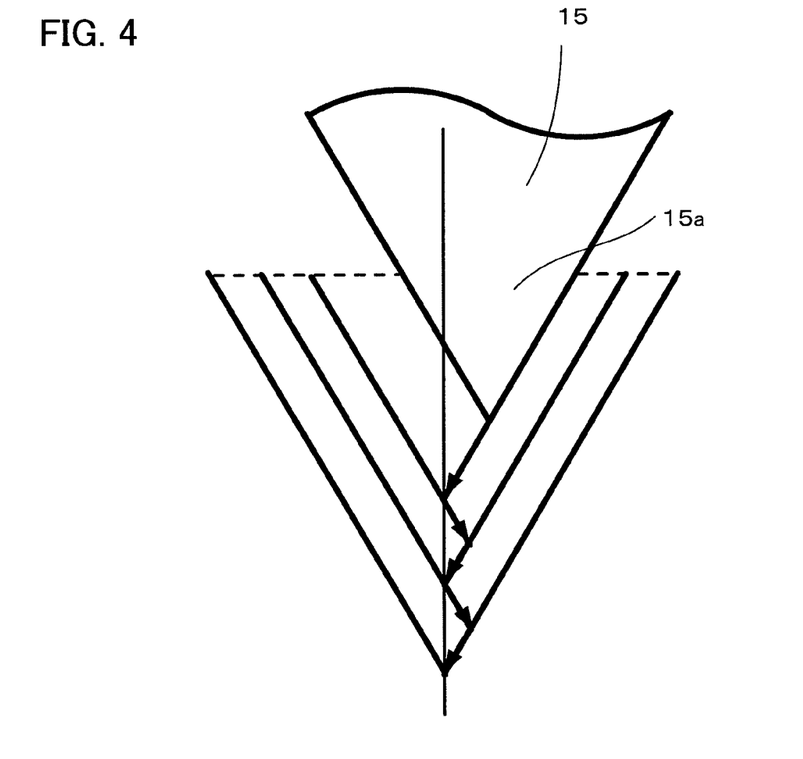
FIG. 4 is a view illustrating a zigzag cutting.

FIG. 3 is a view illustrating the one-edge cutting. In the one-edge cutting, a workpiece is machined by using a piece of a cutting edge 15a (a left piece of the cutting edge 15a in an example in FIG. 3) of the cutting tool 15. FIG. 4 is a view illustrating the zigzag cutting. In the zigzag cutting, the workpiece is machined by using each of pieces of the cutting edge 15a (right and left pieces of the cutting edge 15a in an example in FIG. 4) of the cutting tool 15 one after the other.

Figure 5:
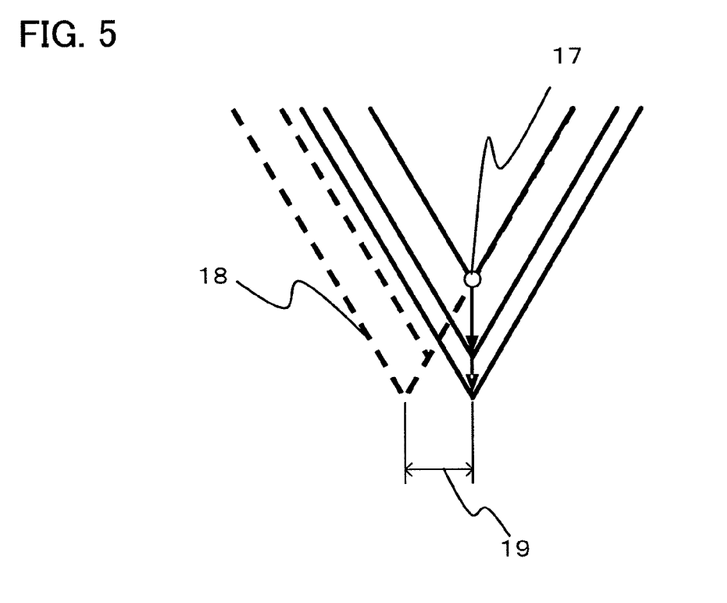
FIG. 5 is a view illustrating a thread cutting re-machining according to a conventional radial incision.

However, in the conventional re-machining according to the thread cutting cycle, a radial incision forming a vertical incision into a thread grove, as shown in FIG. 5, is carried out in place of the one-edge cutting or the zigzag cutting. As a result, there is a problem that not only the advantage of the thread cutting based on the one-edge cutting cannot be obtained, but also a phase is deviated from an originally expected screw thread phase. In FIG. 5, reference numeral 17 denotes a measuring position of the thread groove, reference numeral 18 denotes a shape of the screw thread using the one-edge cutting which is originally expected, and reference numeral 19 denotes a deviation of the screw thread which is generated by the re-machining on the basis of the radial incision.

In the thread cutting cycle, for the purpose of the reduction of the cutting resistance and the improvement of the chip disposal capacity, the thread cutting is carried out using the one-edge cutting (refer to FIG. 3), or the thread cutting is carried out using the zigzag cutting (refer to FIG. 4). In the thread cutting using the one-edge cutting, the thread cutting is carried out by deviating the position for starting the thread cutting in the feed axis direction according to the number of incisions, as shown in FIG. 3. Even in the thread cutting using the zigzag cutting, it is necessary to reflect an amount of deviation of the phase in the screw thread caused by the reattachment of the workpiece (the thread in the process of machining) on the timing for starting the movement of the feed axis, in the same manner as the thread cutting using the one-edge cutting.

It is found that, in order to determine the amount $\theta$ of deviation of the phase of the screw thread, it is necessary to know the position $Z_{ST}$ in the feed axis direction for starting the thread cutting, on the basis of the above expression (1). However, since the position $Z_{ST}$ in the feed axis direction for starting the thread cutting varies on the basis of the number of incisions, the position $Z_{ST}$ in the feed axis direction for starting the thread cutting cannot be obtained until how many incisions have been made until the measured thread groove is machined is known. As a result, it is impossible to determine the amount θ of phase deviation for carrying out the one-edge cutting.

The conventional method of measuring the thread groove does not have any means for specifying the number of incisions, and cannot calculate the amount of phase deviation for carrying out the thread cutting using the one-edge cutting or the zigzag cutting. As a result, in the thread re-machining according to the thread cutting cycle, a radial incision in which incisions are carried out in a manner such that the position in the feed axis direction, stored by the measurement, forms the thread groove, as shown in FIG. 5. Therefore, not only the advantage of the thread cutting using the one-edge cutting or the zigzag cutting cannot be obtained, but also there is a problem that the phase is deviated from the originally expected phase of the screw thread.

SUMMARY OF THE INVENTION

Accordingly, an object of the present invention is to provide a numerical controller having a function of re-machining a thread cutting cycle for machining in line with an originally expected screw thread phase on the basis of thread cutting (re-machining) using a one-edge cutting or a zigzag cutting, while taking the problem of the prior art into consideration.

In the thread re-machining using the one-edge cutting or the zigzag cutting, it is necessary to reflect an amount of deviation in the phase of the screw thread caused by the reattachment of the workpiece (the thread in the process of machining) to the chuck on the timing for starting the movement of the feed axis. In order to calculate the amount of deviation in the phase of the screw thread, a position for starting the thread cutting, and a position where the thread groove was measured need to be known, however, in the re-machining of the thread using the one-edge cutting or the zigzag cutting, the position for starting the thread cutting varies according to the number of incisions. Therefore, it is necessary to specify how many incisions have been made until the measured thread groove is machined. Since it has been conventionally impossible to specify how many incisions have been made until the measured thread groove is machined, the re-machining of the thread has been achieved by the radial incision.

In the case where the thread is re-machined using the one-edge cutting or the zigzag cutting, a position in an incision axis direction is stored in the numerical controller as well as a position in the feed axis direction, at the measuring time of the thread groove, so that the number of incisions can be specified. Further, how many incisions have been made until the measured thread groove is machined is specified on the basis of the position in the feed axis direction and the position in the incision axis direction which are stored, during the analysis of the machining program of the thread cutting cycle. Accordingly, it is possible to calculate the amount of deviation in the phase which is generated by reattaching the workpiece. It is possible to re-machine the thread using the one-edge cutting or the zigzag cutting, by reflecting the amount of deviation in the phase, which is calculated according to the present method, on the timing for starting the movement of the feed axis, and adjusting the starting point by the specified number of incisions.

The numerical controller according to the present invention controls a machine tool which carries out a thread cutting machining, and is provided with a thread re-machining function of re-machining a thread by reattaching a workpiece to a chuck after once detaching the workpiece from the chuck in the process of a thread cutting cycle machining which carries out the thread cutting by repeating motions of positioning a tool at a cutting start position on the basis of a machining program designating a thread shape, and moving the tool in a direction of work axis relatively to the workpiece which is attached to the chuck of the machine tool in synchronization with rotation of a spindle. The numerical controller has a thread position measuring means which measures a position in a feed axis direction and a position in a direction of an incision axis of the thread before re-machining in a state in which the workpiece is attached to the chuck of the machine tool, a number of incisions calculating means which calculates a number of incisions to a thread on the basis of the position in the feed axis direction and the position in the incision axis direction of the thread which are measured by the thread position measuring means, a phase deviating amount calculating means which calculates an amount of deviation in a phase of a screw thread caused by reattachment of the workpiece, on the basis of the number of incisions which is calculated by the number of incisions calculating means, and a thread re-machining means which positions the workpiece or the tool by using the number of incisions and the amount of deviation in the phase so as to re-machine the thread.

The machining program can designate an incising method of a thread shape, and may be structured so as to re-machine the thread by positioning the workpiece or the tool on the basis of the incising method designated by the machining program, the number of incisions and the amount of deviation in the phase.

The numerical controller may be structured so as to further include a registering means which registers a plurality of thread incising methods, and a designating means which designates an incising method among the registered thread incising methods, thereby positioning the workpiece or the tool and re-machining the thread, on the basis of the incising method designated by the designating means, the number of incisions, and the amount of deviation in the phase.

Since the present invention is provided with the above structures, the present invention can provide the numerical controller having the function of carrying out re-machining of thread cutting cycle for machining a screw thread in line with the originally expected screw thread phase, on the basis of the re-machining using the one-edge cutting or the zigzag cutting.

BRIEF DESCRIPTION OF THE DRAWINGS

The object and the features mentioned above and the other objects and features of the present invention will be apparent from the following description of embodiments with reference to the accompanying drawings, in which.

DETAILED DESCRIPTION OF THE PREFERRED EMBODIMENTS

A numerical controller having a function of re-machining a thread cutting cycle is provided with a storage device (a memory), a CPU (an arithmetic processor), an interface which transmits and receives data to/from an input and output device including a keyboard and a display, and an interface which transmits and receives data to/from a drive circuit of a motor for each of axes driving each of axes of a machine tool. The motors drive axes, such as a spindle to which a chuck 10 for griping a workpiece is connected and a drive axis which moves a tool, and each of these motors is provided with a position detector which detects a rotational position of the motor. The positional information detected by the position detector is transmitted to the numerical controller. The storage device stores software executing the thread cutting cycle in the storage device. It is known that the structure mentioned above is provided in the numerical controller which controls the machine tool carrying out the thread cutting machining.

The numerical controller according to the present invention is characterized in that the storage device stores software to implement a function of re-machining a thread cutting cycle mentioned later (a process of measuring a thread groove, and a process of determining an amount θ of phase deviation in a screw thread).

A description will be given of an outline of a "thread cutting cycle function for carrying out thread cutting".

In the thread cutting cycle function (hereinafter referred to as thread cutting cycle) for carrying out the thread cutting, a finished shape such as a height of the screw thread, and a first incision amount are only commanded, and a machining route in the middle of the process is automatically decided, whereby a thread machining is carried out. In other words, in the thread cutting cycle, the thread cutting machining is repeated while changing the incision amount little by little, and the thread machining having the commanded shape given by the machining program is finally applied to the workpiece. The incision amount and the machining route in the thread cutting machining steps in each time are automatically decided, and the thread having the commanded shape is machined.

Figure 6:
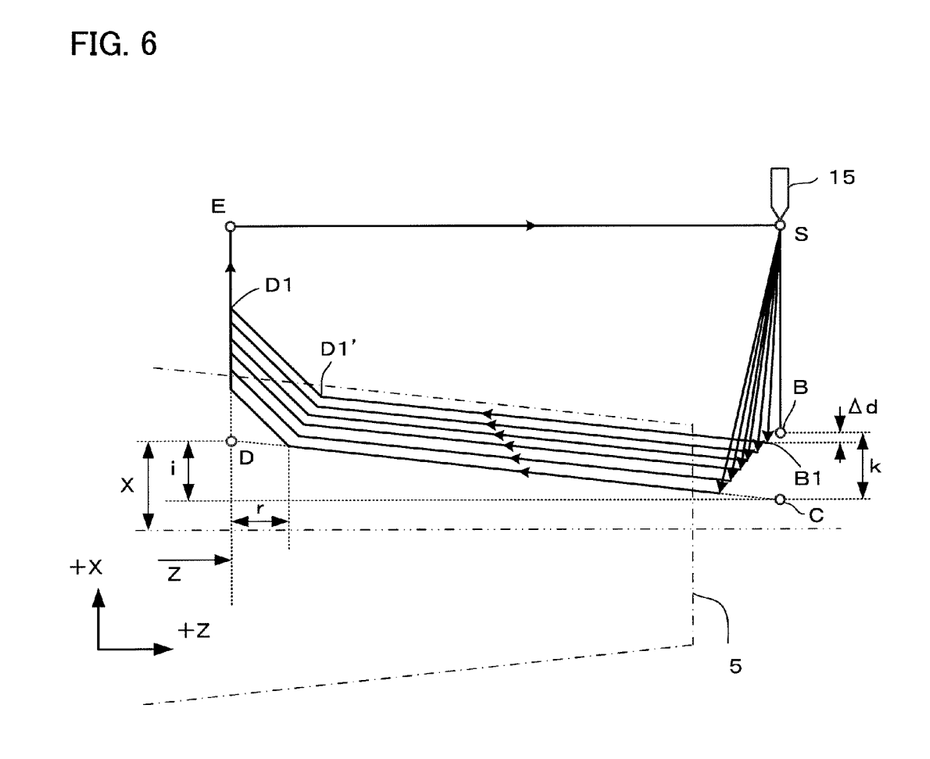
FIG. 6 is a view illustrating an example of a typical thread cutting cycle.

An example of a typical thread cutting cycle is shown in FIG. 6.

In FIG. 6, a direction of Z-axis is set to a feed axis direction of the thread before re-machining which is attached to a chuck, and a direction of X-axis is set to an incision axis direction. A workpiece 5 is attached to the chuck 10 which is fixed to a spindle of a machine tool (not shown) and is rotated at a predetermined rotating speed, in the case of a thread cutting machining achieved by a cutting tool 15. Reference signs X and Z denote coordinate values of a point D. Reference sign i denotes a radial difference in a thread portion, and a straight thread cutting is achieved by setting i=0. Reference sign k denotes a height of the screw thread (a distance in the direction of an X-axis is designated), reference sign Δd denotes an amount of first incision, and reference sign r denotes a finishing amount of the thread. In a first step (a first incision) of the thread cutting cycle, the cutting tool 15 moves through a route of a position S→a position B1→a position D1'→a position D1→a position E→the position S.

A start position in the feed axis direction is set to $Z_{ST-n}$, and a start position in the incision axis direction is set to $X_{ST-n}$, in the thread cutting according to n-th incision. The start positions $Z_{ST-n}$ and $X_{ST-n}$ can be obtained by a program analyzing portion (CPU) of the numerical controller.

Next, a description will be given of "designation of a method of incising in a thread shape".

As described before, the one-edge cutting (FIG. 3) or the zigzag cutting (FIG. 4) is normally used for the incision in the thread shape. Further, an incision aspect of the thread shape is differentiated on the basis of whether or not a cutting amount is fixed, or whether or not an incision amount is fixed.

In the incision in the thread shape having a fixed cutting amount, a cross sectional area for cutting the workpiece 5 is fixed every time. In this incision aspect, the deeper the thread groove is, the less the incision amount is, so that a load applied to the cutting tool 15 is not changed so much till the last. On the other hand, in the incision in the thread shape having a fixed incision amount, the depth of the incision applied to the thread groove is fixed every time. In this incision aspect, a number of incisions is reduced and a machining time becomes shorter; however, since a cut amount is increased when the thread groove becomes deeper, the load applied to the cutting tool 15 is increased. In the machining program, the incision method is designated by a unique "number" which is given to each of the methods of incising in the thread shape. The numerical controller recognizes the inherent "number" designated by the machining program, and machines the workpiece 5 according to the recognized machining method.

Specifically, the following "numbers" are, for example, given to the respective incision methods.

Number 1: one-edge cutting having a fixed cutting amount
Number 2: zigzag cutting having a fixed cutting amount
Number 3: one-edge cutting having a fixed incision amount
Number 4: zigzag cutting having a fixed incision amount In order to re-machine the thread using the one-edge cutting or the zigzag cutting, it is necessary to specify how many incisions have been made until the measured thread groove is machined. Accordingly, when measuring the position of the thread groove, the position in the incision axis direction is also measured and stored, in addition to the position in the feed axis direction of the thread.

Figure 7:
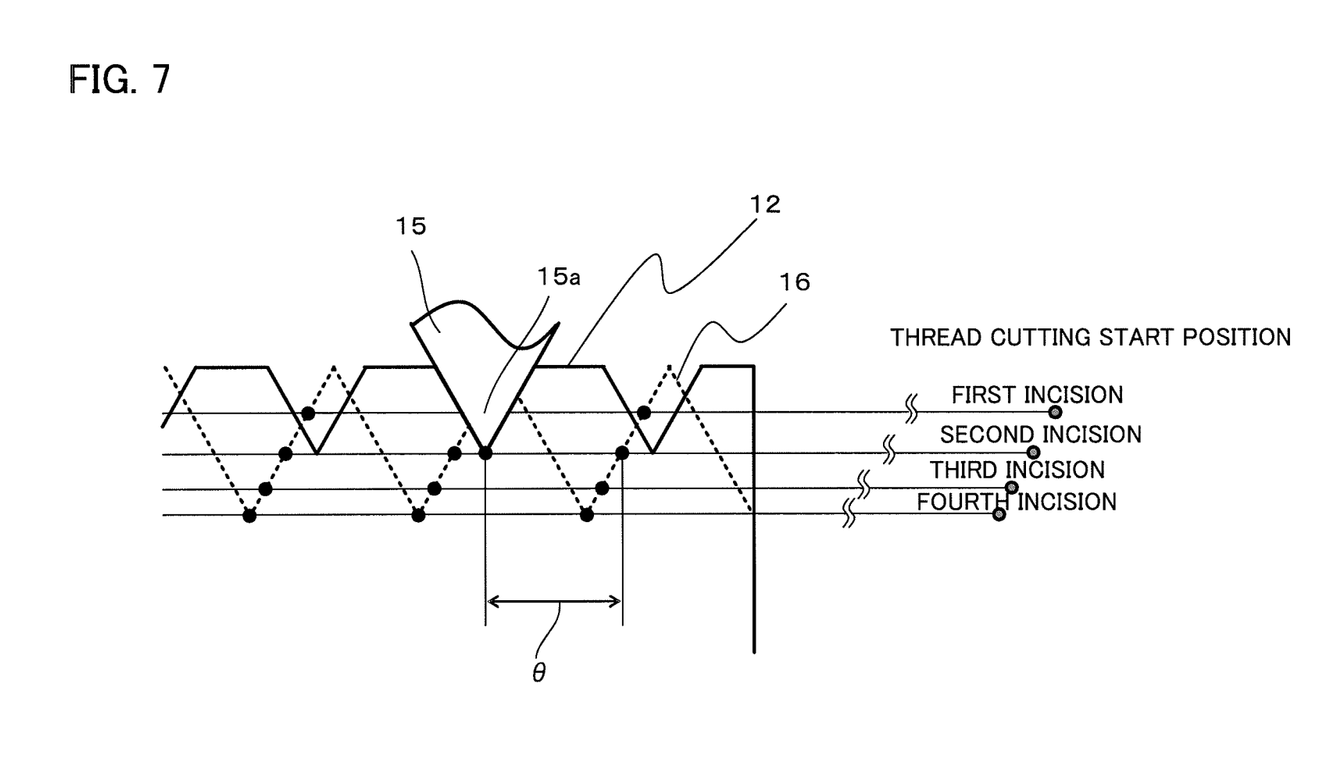
FIG. 7 is a view illustrating a method of measuring a thread groove position which is machined using a one-edge cutting.

FIG. 7 is a view illustrating a method of measuring the position of the thread groove which is machined using the one-edge cutting.

In a state in which the chuck 10 fixed to the spindle of the machine tool (not shown) is stopped at a reference position, the cutting edge 15a of the cutting tool 15 is applied to a groove of the thread 12 which is reattached to the chuck 10. Further, the numerical controller which controls the machine tool stores the position in the feed axis direction of the thread and the position in the incision axis direction into the storage device in the numerical controller, at a timing for inputting a signal or issuing a command according to the machining program. The position measurement is carried out, for example, by using a signal from a position detector which is provided in the motor for each of the axes.

Figure 8:
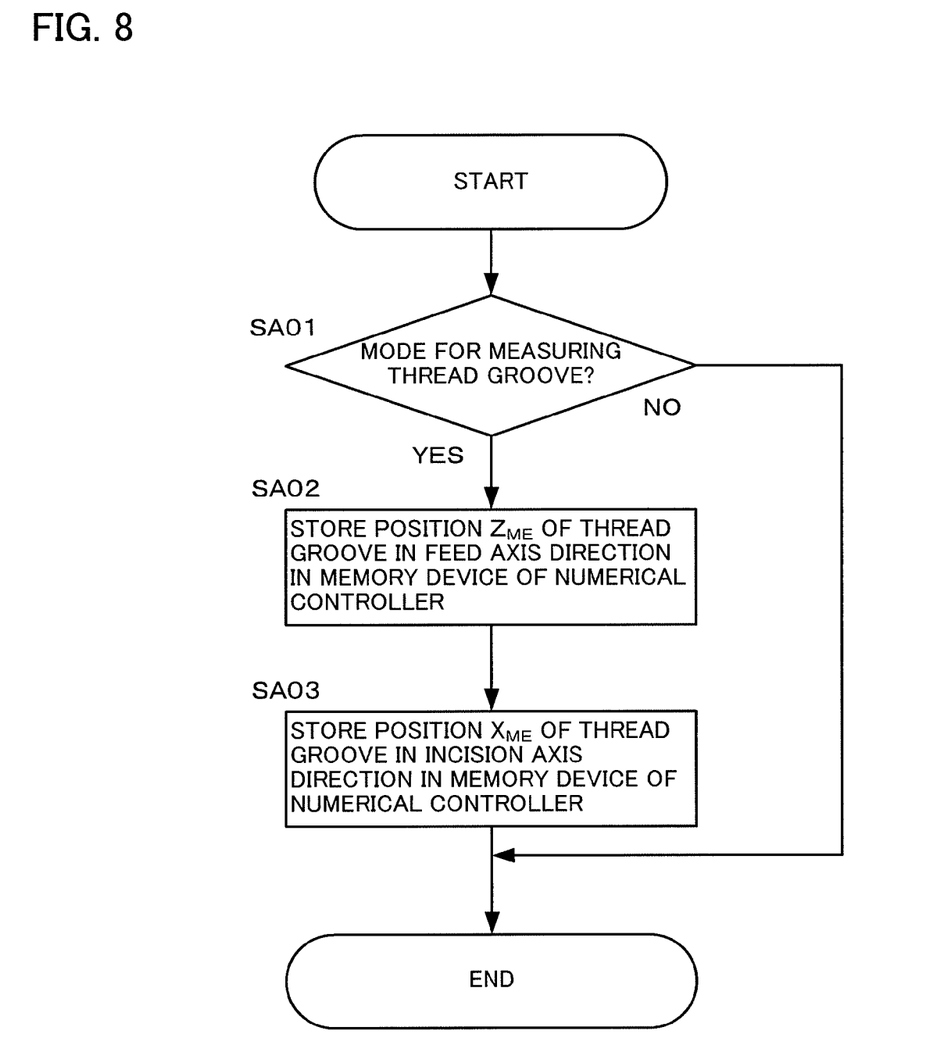
FIG. 8 is a flow chart for explaining a process of measuring a thread groove position.

FIG. 8 is a flow chart of a process of measuring the thread groove position. A description will be given below according to each of steps.

[Step SA01] It is determined whether or not the mode is a mode for measuring the thread groove. If it is a mode for measuring the thread groove (YES), the process proceeds to step SA02. If it is not a mode for measuring the thread groove (NO), on the other hand, the process of measuring the thread groove is finished.

[Step SA02] The position $Z_{ME}$ of the thread groove in the feed axis direction is stored in the storage device of the numerical controller.

[Step SA03] The position $X_{ME}$ of the thread groove in the incision axis direction is stored in the storage device of the numerical controller, and this processing is finished.

Next, a description will be given of a method of specifying the number of incisions from the position in the feed axis direction and the position in the incision axis direction with reference to FIG. 9.

Figure 9:
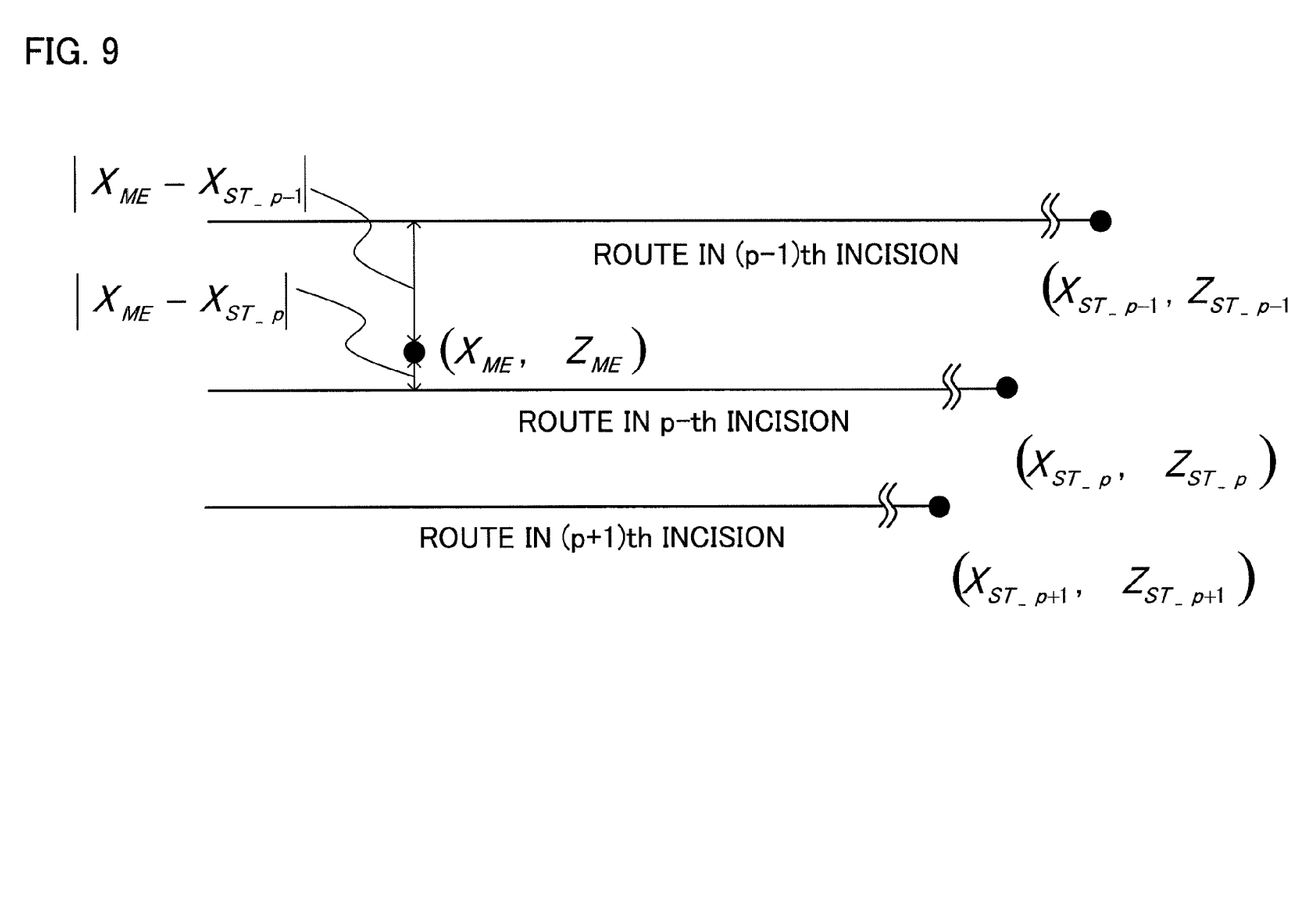
FIG. 9 is a view illustrating a method of specifying a number of incisions.

FIG. 9 shows a machining route of the thread cutting using the one-edge cutting, and a point obtained by the measurement of the thread groove. The position of the thread groove in the feed axis direction obtained by the measuring process in FIG. 8 is set to $Z_{ME}$, and the position of the thread groove in the incision axis direction is set to $X_{ME}$. Further, in the thread cutting in the p-th incision, the start position in the feed axis direction is set to $Z_{ST-p}$ and the start position in the incision axis direction is set to $X_{ST-p}$. These thread cutting start positions can be obtained by a program analyzing portion (CPU (arithmetic processor)) of the numerical controller.

In the case of restarting the thread cutting machining, the position of the thread groove stored in the storage device of the numerical controller is not necessarily on the machining route of the thread cutting due to an error produced at the time of measuring. Therefore, it is necessary to search a machining route of a cycle machining which is the closest to the measured position. In the program analyzing portion (CPU) of the numerical controller, a distance $|X_{ME}-X_{ST-n}|$ between the machining route of the thread cutting and the measured point is calculated in sequence from the first incision (n=1, 2, ...).

In the case where $|X_{ME}-X_{ST-n}|$ is the smallest, it can be said that the measured point is the closest to the machining route of the thread cutting in the n-th incision in the number of incisions. In other words, the measured point is the closest in the case where n=p is established in FIG. 9, and the measured thread groove can be determined to be a thread groove which is machined to the p-th incision. The distance $|X_{ME}-X_{ST-n}|$ can be calculated from n=1 to the maximum number of incisions $n_{max}$ of the thread groove in the incision axis direction, and "n" that gives the minimum value among the values $|X_{ME}-X_{ST-n}|$) obtained by the calculation can be determined as the number of incisions. The maximum number of incisions $n_{max}$ of the thread groove in the incision axis direction can be obtained by analyzing the machining program.

Further, an amount θ of phase deviation [rev] of the screw thread caused by the reattachment of the thread can be calculated according to the following expression (2).

$$\theta = \frac{|Z_{ME} - Z_{ST\_p}| - L \times e}{L} \quad (2)$$
$$e = [|Z_{ME} - Z_{ST\_p}|/L]$$

In the above expression, L (mm) represents a lead (pitch) of the thread, and reference sign [x] denotes Gaussian symbol indicating a maximum integer which does not go beyond x.

The re-machining of the thread cutting cycle can be carried out using the one-edge cutting or the zigzag cutting from the p-th time, by reflecting the amount of phase deviation obtained according to the above expression (2) on the timing for starting the movement of the feed axis.

Figure 10:
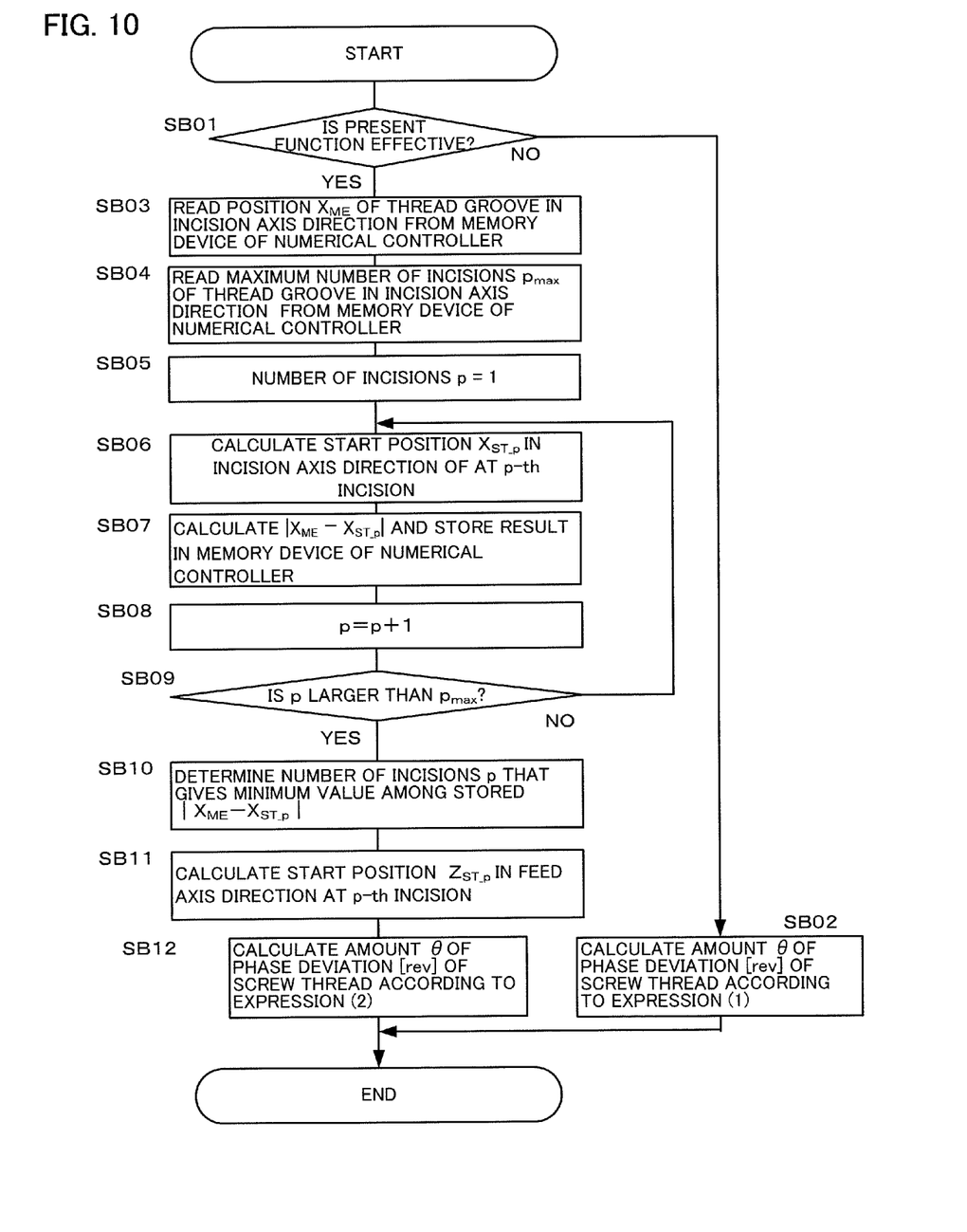
FIG. 10 is a flow chart for explaining a process of determining an amount θ of phase deviation of a screw thread.

FIG. 10 is a flow chart of a process for determining the amount θ of phase deviation [rev] of the screw thread. A description will be given below according to each of steps.

[Step SB01] It is determined whether the function of re-machining the thread cutting cycle is effective or not. If the function is effective (YES), the process proceeds to step SB03, but if the function not effective (NO), the process proceeds to step SB02.

[Step SB02] The amount θ of phase deviation [rev] of the screw thread is calculated by using the above expression (1), and this processing is finished.

[Step SB03] The position $X_{ME}$ of the thread groove in the incision axis direction is read from the storage device of the controller.

[Step SB04] The maximum number of incisions $p_{max}$ of the thread groove in the incision axis direction is read from the storage device of the controller.

[Step SB05] The the number of incisions p is set to an initial value 1.

[Step SB06] A start position $X_{ST-p}$ in the incision axis direction at the p-th incision of the thread cutting in the incision frequency is calculated.

[Step SB07] $|X_{ME}-X_{ST-p}|$ is calculated and stored in the storage device of the numerical controller.

[Step SB08] The number of incisions p is updated by adding 1 to the number of incisions p.

[Step SB09] It is determined whether or not the updated number of incisions p is beyond the maximum number of incisions $p_{max}$. If the updated number of incisions p is not beyond $p_{max}$ (NO), the process proceeds to step SB06. If the updated number of incisions p is beyond $p_{max}$ (YES), on the other hand, the process proceeds to step SB10.

[Step SB10] A value of "p" that gives the minimum value among $|X_{ME}-X_{ST-p}|$ stored in the storage device of the controller is determined.

[Step SB11] A start position $Z_{ST-p}$ in the feed axis direction of the thread cutting corresponding to the value of p determined by the preceding step SB10 (that is, a start position $Z_{ST-p}$ in the feed axis direction of the thread cutting in the "p"-th incision) is calculated.

[Step SB12] The amount θ of phase deviation [rev] of the screw thread is calculated by using the above expression (2), on the basis of $Z_{ST-p}$ which is calculated by the preceding step SB11, the position $Z_{ME}$ of the thread groove in the feed axis direction which is stored in the storage device of the numerical controller according to the process of the step SA02 in FIG. 8, and the lead L (mm) of the thread, and this processing is finished.

Next, a description will be given of an example of a method of calculating the start position $X_{ST-n}$ in the incision axis direction and the start position $Z_{ST-n}$ in the feed axis direction, at the n-th incision of the thread cutting machining.

The start position $X_{ST-n}$ in the incision axis direction and the start position $Z_{ST-n}$ in the feed axis direction, at the n-th incision of the thread cutting machining, can be obtained from an angle a of the cutting edge, a height k of the screw thread, a finishing allowance D, and the first incision amount Δd which are obtained from the program analyzing portion of the numerical controller.

A description will be given of an example of a method of determining the start position $X_{ST-n}$ in the incision axis direction and the start position $Z_{ST-n}$ in the feed axis direction, at the n-th incision of the thread cutting machining, in the case of the one-edge cutting having the fixed cutting amount, with reference to FIG. 11.

Figure 11:
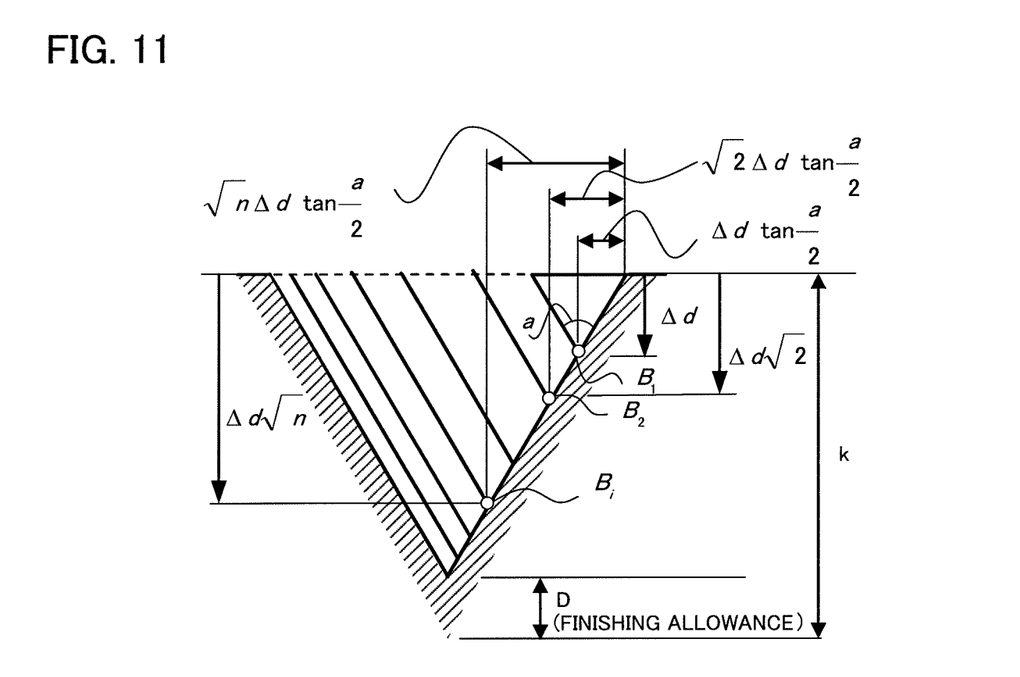
FIG. 11 is a view illustrating an example of the one-edge cutting having a fixed cutting amount.

The start position $X_{ST-n}$ in the incision axis direction of the n-th thread cutting can be calculated from the command values (the angle a of the cutting edge, the height k of the screw thread, the finishing allowance D, and the first incision amount Δd) which are obtained from the program analyzing portion, according to the following expression (3) as shown in FIG. 11.

$$X_{ST\_N} = \Delta d \sqrt{n} \quad (3)$$

At this time, the start position $Z_{ST-n}$ in the feed axis direction of the thread cutting is calculated according to the following expression (4).

$$Z_{ST\_n} = \sqrt{n}\, \Delta d \tan\frac{a}{2} \quad (4)$$

In the case of "Number 1: one-edge cutting having a fixed cutting amount" mentioned above, the above expression (3) is used in the calculation of a distance $|X_{ME}-X_{ST-n}|$ between the machining route of the thread cutting and the measured point. Accordingly, a value of "n" which minimizes the value of $|X_{ME}-X_{ST-n}|$ is determined. Further, the start position $X_{ST-p}$ in the incision axis direction and the start position $Z_{ST-p}$ in the feed axis direction of the p-th incision of the thread cutting machining are determined by calculating the above expressions (3) and (4) while setting n=p.

The re-machining of the thread using the zigzag cutting has been conventionally achieved by the radial incision. Similar to the machining with the one-edge cutting, in the zigzag cutting, the amount of phase deviation of the screw thread caused by the reattachment of the thread cannot be calculated until how many incisions has been made until the measured thread groove is machined is specified. The amount of phase deviation of the screw thread caused by the thread reattachment can be calculated in the same manner as the one-edge cutting, by also storing the start position in the incision axis direction of the thread cutting at the time of measuring the thread groove, and using the method described above. Thus, it is possible to re-machine the thread by using the zigzag cutting.

On the other hand, in the case of "Number 2: zigzag cutting having a fixed cutting amount" mentioned above, the start position $X_{ST-n}$ in the incision axis direction and the start position $Z_{ST-n}$ in the feed axis direction, at the n-th incision of the thread cutting machining, is differently calculated depending on whether the value of n (number of incisions) is even or odd. In the case where n is even, the start position $X_{ST-n}$ in the incision axis direction and the start position $Z_{ST-n}$ in the feed axis direction, at the n-th incision of the thread cutting machining (n=2 m (m=1, 2, 3, ...)), are expressed by the following expressions (5) and (6), respectively.

$$X_{ST\_n=2m} = \Delta d \sqrt{n} \quad (5)$$

$$Z_{ST\_n=2m} = (k-D)\tan\frac{a}{2} \quad (6)$$

On the other hand, in the case where n is odd, the start position $X_{ST-n}$ in the incision axis direction and the start position $Z_{ST-n}$ in the feed axis direction, at the n-th incision of the thread cutting machining (n=2 m−1 (m=1, 2, 3, ...)), are expressed by the following expressions (7) and (8), respectively.

$$X_{ST\_n=2m-1} = \frac{\Delta d(\sqrt{n+1} + \sqrt{n-1})}{2} \quad (7)$$

$$Z_{ST\_n=2m-1} = Z_{ST\_n=2m} + \frac{\Delta d(\sqrt{n+1} - \sqrt{n-1})}{2} \cdot \tan\frac{a}{2} \quad (8)$$

In the conventional re-machining of the thread cutting cycle, the process can be achieved only by the radial incision. The radial incision generally tends to generate chatter since a contact surface between the cutting edge and the member to be cut becomes wider. Further, the phase of the re-machined screw thread is deviated from the phase of the original screw thread to be machined by the one-edge cutting. However, according to the present invention which allows re-machining with the one-edge cutting, it is possible to achieve the re-machining in line with the phase of the originally expected screw thread. Further, the chatter can be suppressed by the one-edge cutting.

The one-edge cutting is generally suitable for the machining of a thread having a large pitch. As a result, the present invention is suitable for the re-machining of a large-size screw and a screw in which the phase of its screw thread is designated. Further, the same effect as the one-edge cutting can be obtained in the zigzag cutting.

The invention claimed is:

1. A numerical controller controlling a machine tool which carries out thread cutting machining, the numerical controller having a thread re-machining function of re-machining a thread by reattaching a workpiece to a chuck, after once detaching the workpiece from the chuck, in the process of a thread cutting cycle in which the thread cutting is carried out by repeating motions of positioning a tool at a cutting start position on the basis of a machining program designating a thread shape, and moving the tool in a direction of work axis relatively to the workpiece which is attached to the chuck of the machine tool in synchronization with rotation of a spindle, wherein the numerical controller comprises:

a thread position measuring means for measuring a position in a feed axis direction and a position in a direction of an incision axis of the thread before re-machining in a state in which the workpiece is attached to the chuck of the machine tool;

a number of incisions calculating means for calculating a number of incisions to a thread on the basis of the position in the feed axis direction and the position in the incision axis direction of the thread which are measured by the thread position measuring means;

a phase deviating amount calculating means for calculating an amount of deviation in a phase of the screw thread caused by reattachment of the workpiece, on the basis of the number of incisions which is calculated by the number of incisions calculating means; and a thread re-machining means for positioning the workpiece or the tool by using the number of incisions and the amount of deviation in the phase so as to re-machine the thread.

2. The numerical controller controlling a machine tool which carries out thread cutting machining according to claim 1, wherein the machining program can designate an method of incising in a thread shape, and re-machines the thread by positioning the workpiece or the tool on the basis of the method of incising designated by the machining program, the number of incisions and the amount of deviation in the phase.

3. The numerical controller controlling a machine tool which carries out thread cutting machining according to claim 1, further comprising:
- a means for registering a plurality of thread incising methods; and
- a designating means for designating an incising method among the registered thread incising methods,
- wherein the numerical controller positions the workpiece or the tool and re-machines the thread, on the basis of the incising method designated by the designating means, the number of incisions, and the amount of deviation in the phase.

* * * * *